(No Model.)
J. A. THRONSON.
HARROW.
No. 278,632. Patented May 29, 1883.
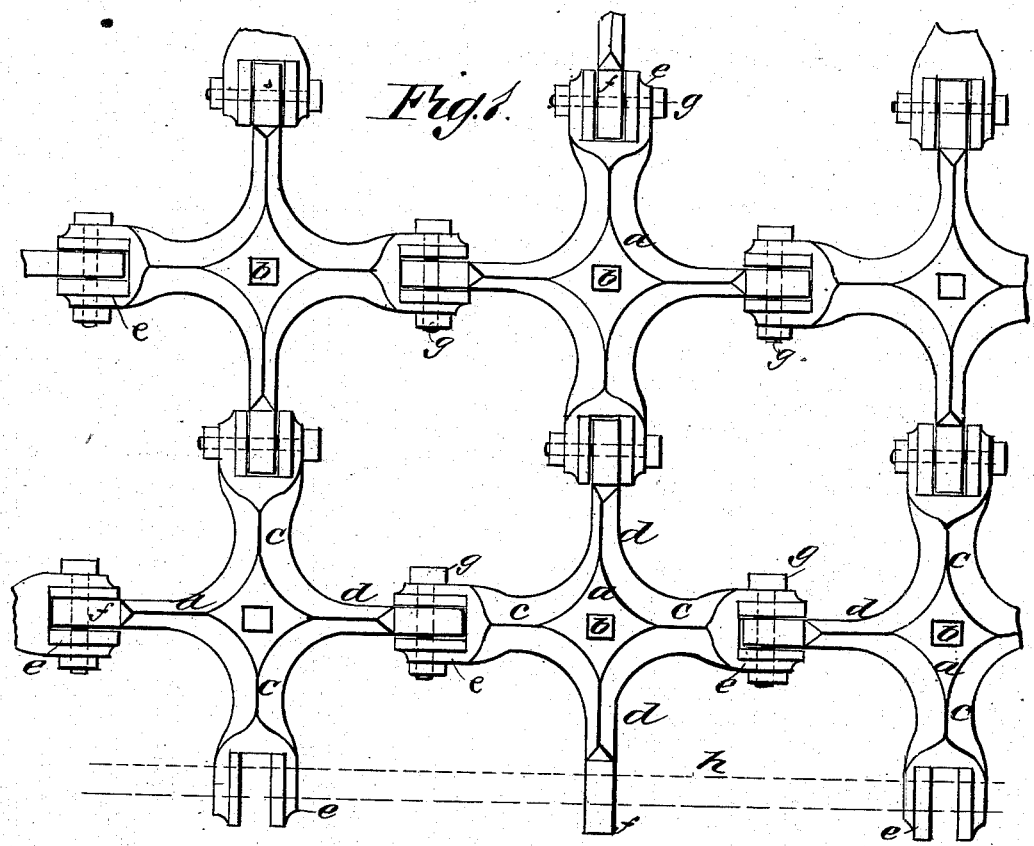
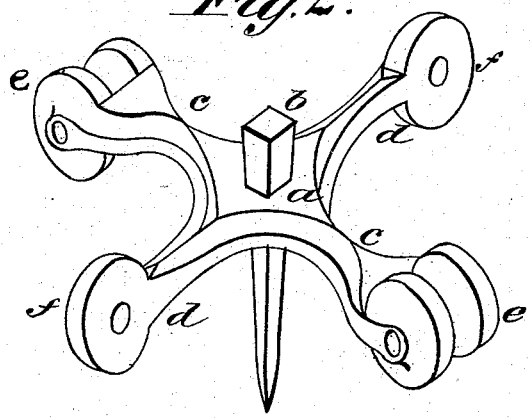
WITNESSES:
Francis McArdle
C. Sedgwick
INVENTOR:
J. A. Thronson
BY Munn & Co
ATTORNEYS.

UNITED STATES PATENT OFFICE.

JOEL A. THRONSON, OF DAYTON, WASHINGTON TERRITORY.

HARROW.

SPECIFICATION forming part of Letters Patent No. 278,632, dated May 29, 1883.

Application filed January 25, 1883. (No model.)

*To all whom it may concern:*

Be it known that I, JOEL A. THRONSON, of Dayton, in the county of Columbia and Territory of Washington, have invented certain new and useful Improvements in Harrows, of which the following is a full, clear, and exact description.

This invention consists of a novel contrivance of the harrow-frame in separate sections, and jointing the sections together in manner to enable sections to be added or detached for increasing or diminishing the size of the harrow; also for changing its form as may be desired, each section being preferably constructed for one tooth, and consisting of a center and four arms radiating from it for jointing with the other sections, the joints being interchangeable, so that any section may be added to any others, whereby, besides enabling the harrow to be varied as to size and shape, the teeth will conform to the surface of the ground better and do better work, and by making the sections in cast iron or steel the harrow can be made very cheaply, all as hereinafter fully described.

Reference is to be had to the accompanying drawings, forming part of this specification, in which similar letters of reference indicate corresponding parts in both the figures.

Figure 1 is a plan view of a harrow, comprising six sections, constructed according to my invention; and Fig. 2 is a perspective view of one of the sections.

I make the said sections to consist of a center, $a$, having a hole for a tooth, $b$, and four arms, $c\ d$, radiating from said center to connect with the other sections, two of said arms having double eyes $e$, and two having single eyes $f$, making them interchangeable in combination with each other by pivot-bolts $g$. I propose to make said sections of cast iron or steel, and will, if desired, cast them around the teeth for connecting them to the sections; but I may forge or otherwise construct the sections, and may fit the teeth in the holes after the sections are made. A rod, $h$, (shown in dotted lines,) may be passed through the eyes at one side for a means of connecting the team. The pivot-bolts $g$ are to be fitted so as to be readily put in and taken out for adding and removing the sections, thus enabling the harrow to be readily changed as to size and form, as may be required from time to time.

While I prefer to make a section for each tooth, it is evident that I may make them on the same plan for two or more teeth, and I do not mean to limit myself in that respect.

It will be seen that the teeth of such a harrow will take much better effect on the soil by reason of their more uniform relation to the surface, and it is believed that it will work with less resistance because of working smoothly.

I am aware that it is not new to make a harrow-section, in the shape of a cross with a central hole for a tooth, or to connect the arms with one another with a surrounding frame or a front bar by links; but What I do claim as new and of my invention is—

A centrally-apertured harrow-section cross, having the two opposite arms, $c\ c$, provided each with two eyes, $e\ e$, and the two opposite arms $d\ d$, having each a single eye, $f$, as shown and described.

JOEL A THRONSON.

Witnesses:
MATTHEW RIGGS,
ALEXANDER W. TAYLOR.